Aug. 20, 1963 L. S. ENGLE ET AL 3,100,981
METHOD AND APPARATUS FOR EVALUATING
THE RELATIVE ABRASIVENESS OF INKS
Filed Oct. 6, 1959
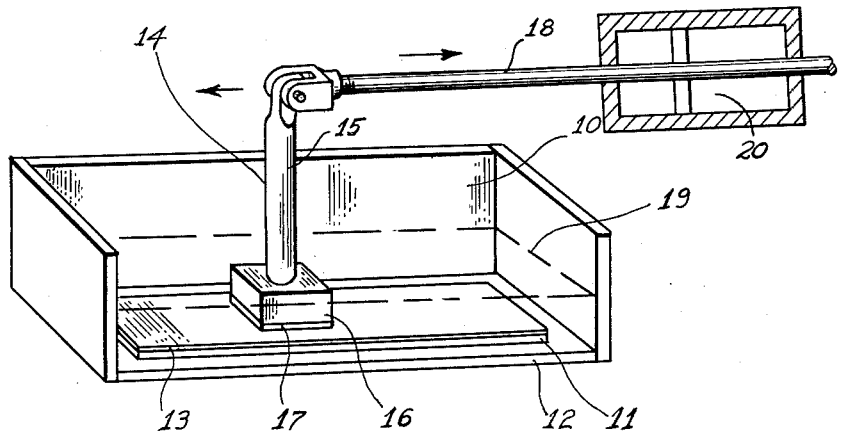
INVENTORS.
LOY S. ENGLE
KENNETH A. BOWNES
HUGH J. DUNN

United States Patent Office 3,100,981
Patented Aug. 20, 1963

3,100,981
METHOD AND APPARATUS FOR EVALUATING THE RELATIVE ABRASIVENESS OF INKS
Loy S. Engle, Harrington Park, and Hugh J. Dunn, Pines Lake, N.J., and Kenneth A. Bownes, Queens Village, N.Y., assignors to Interchemical Corporation, New York, N.Y., a corporation of Ohio
Filed Oct. 6, 1959, Ser. No. 844,660
4 Claims. (Cl. 73—7)

The invention relates to the measurement of the relative abrasiveness of suspensions. More particularly it relates to a method and apparatus for determining the relative abrasiveness of inks wherein pigment is dispersed in a liquid vehicle.

In the gravure printing industry, the use of chromium plated cylinders is becoming more and more extensive. The use of chromium plate greatly increases the resistance of the cylinder and thereby more than doubles the number of printed copies producible from said cylinder. While the chromium plating is very durable during normal wear, abnormal wear mainly due to abrasion has been a problem of constant concern to the gravure printing art for many years. This abnormal wear causes deep streaks or lines around the circumference of the plated cylinder which obviously interferes with further printing. This undesirable abrasiveness in the inks is dependent upon the intrinsic hardness and particle shape of the pigments and extenders used in the ink formulation. The viscosity and nature of the varnish used in the ink also contribute to the overall abrasiveness of the ink.

In view of the foregoing, the gravure printing art has for many years sought effective means for evaluating the relative abrasiveness of gravure inks. Attempts were made to duplicate the gravure cylinders and apparatus on a small scale for test purposes. Such tests were not successful because mechanical factors such as the angle and condition of the doctor blade as well as the application pressure and hardness of the blade contributed to the abnormal wear and it was, accordingly, difficult to ascertain whether the extent of the wear was due to the ink and not due to these mechanical factors.

There has now been discovered a novel apparatus and method for determining the relative abrasiveness of suspensions of solid particles in liquid media as well as of pastes comprising solid particles wetted by liquid media. This invention now makes possible the accurate determination of the relative abrasiveness of inks wholly independent of the influence of the above described mechanical factors.

According to this invention, the determination of the relative abrasiveness of a tested ink is determined by the increase in light transmittance of a glass plate having one surface chromium coated after the chromium coating has been subjected to the reciprocating rubbing action of a non-brasive resilient fabric with a uniform applied pressure and velocity while immersed in the tested ink. The effect of this procedure on the coated glass plate is then compared to the effect of the same conditions using a standard ink on a similar coated glass plate to determine the relative abrasiveness of the ink tested.

In order to carry out the novel process of this invention, a novel apparatus has been devised. This apparatus comprises a reservoir for holding the ink to be tested, a glass plate mounted within said reservoir which has a thin uniform chromium coating deposited on one of its surfaces. Reciprocated rubbing means are mounted within said reservoir. These rubbing means have one planar surface covered with a non-abrasive resilient fabric in frictional contact with said chromium coating and means for reciprocating said rubbing member over said chromium coating.

It has been found that the most desirable results are obtained when chromium plated glass or mirrors prepared by the vacuum evaporation of chromium and its deposition onto glass are used. This is due to the fact that vacuum deposited chromium coatings display excellent adhesion to the substrate and are capable of being deposited in very thin layers in order of .000003 inch and less.

It will be understood that by measuring the amount of light transmitted by a chromium mirror, before and after abrasion, a relative value may be assigned which corresponds to the amount of chromium removed from the surface. The light transmittance measurements may be by any device which can measure the quantity of the transmitted visible light. A spectrophotometer is a suitable instrument of this type. Abrasiveness of the ink tested can then be interpreted as the difference in percentage of transmitted light before and after the rubbing of the immersed mirror.

When determining the relative transmittance, it is preferred to measure transmitted light having a wavelength of 550 m$\mu$ since this wavelength is at the center of the visible spectrum. However, light having other wavelengths within the visible spectrum may also be used.

It has been found that best results are obtained when a mirror having a 30% initial transmittance is used.

The fabric used in the rubbing operation should be non-abrasive and resilient. Felt is used in the preferred embodiment of the invention. However, "Kitten's ear broadcloth" or non-abrasive napped fabrics such as flannel may readily be used.

It will be understood that it is not intended to limit this invention to only testing of the action of inks on chromium plate. The invention may readily be used to test the action of any abrasives which comprise solid particles wetted by a liquid medium such as various abrasive polishes. Further metals other than chromium such as nickel and cadmium may be tested by embodiments of this invention.

Other objects and further advantages will be more fully apparent from a description of the accompanying drawing in which:

The FIGURE is a prospective view of the apparatus of this invention with the front of the reservoir removed.

Referring to the figure, reservoir 10 has its front section removed to expose its enclosed chamber. Glass plate 11 is supported on floor 12 of the reservoir. Chromium coating 13 covers the upper surface of plate 11. Rubbing finger 14 comprises rod 15, weighted block 16 and felt patch 17, in frictional contact with the upper surface of chromium coating 13. Weighted block 16 insures that felt patch 17 will be applied to coating 13 under slight pressure. Suitable driving means 20 reciprocate arm 18 which in turn reciprocates rubbing finger 14 causing felt patch 17 to reciprocatingly rub coating 13 along the longitudinal axis of plate 11. The entire operation of the apparatus is conducted while the reservoir contains the ink 19 to be tested. The means driving reciprocatable arm 18 may be either motor driven or manually operated.

While there have been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for testing the abrasiveness of compositions of solid particles wetted by a liquid medium comprising a reservoir for holding the composition to be tested, a glass plate mounted within said reservoir having a thin uniform metal coating deposited on one surface thereof, a rubbing member reciprocatably mounted within said reservoir, said member having one planar surface covered with a non-abrasive resilient fabric in frictional contact with said metal coating and means for reciprocating said rubbing member over said metal coating.

2. Apparatus for testing the abrasiveness of inks comprising a reservoir for holding the ink to be tested, a glass plate mounted within said reservoir having a thin uniform coating of high vacuum evaporated chromium deposited on one surface thereof, a rubbing member reciprocatably mounted within said reservoir, said member having one planar surface covered with a non-abrasive resilient fabric in frictional contact with said chromium coating and means for reciprocating said rubbing member over said chromium coating.

3. The apparatus claimed in claim 2, wherein said chromium coating transmits 30% of all incident light.

4. A method for testing the abrasiveness of an ink comprising immersing a glass plate having a thin uniform chromium coating deposited on one surface thereof in the ink to be tested, said coated plate having a known light transmittance, reciprocatably rubbing a non-abrasive resilient fabric across said immersed chromium coating with a uniform pressure and velocity for a predetermined number of times and then determining the light transmittance of the coated glass plate for comparison with the known transmittance of said plate prior to rubbing.

References Cited in the file of this patent

UNITED STATES PATENTS

| | | |
|---|---|---|
| 2,393,684 | Hoff et al. | Jan. 29, 1946 |
| 2,414,439 | Brandon | Jan. 21, 1947 |
| 2,734,375 | Galbraith et al. | Feb. 14, 1956 |

OTHER REFERENCES

Publication: "Test for Resistance of Porcelain Enamels to Surface Abrasion," Porcelain Enamel Institute Inc., Washington, D.C., March 1942, pages 3–11.